(12) United States Patent
Hagström et al.

(10) Patent No.: US 10,187,589 B2
(45) Date of Patent: Jan. 22, 2019

(54) SYSTEM AND METHOD FOR MIXING A SCENE WITH A VIRTUAL SCENARIO

(75) Inventors: Måns Hagström, Järfälla (SE); Ulf Erlandsson, Kungsbacka (SE); Johan Borg, Linköping (SE); Folke Isaksson, Linköping (SE); Ingmar Andersson, Linköping (SE); Adam Tengblad, Huskvarna (SE)

(73) Assignee: SAAB AB, Linköping (SE)

( * ) Notice: Subject to any disclaimer, the term of this patent is extended or adjusted under 35 U.S.C. 154(b) by 582 days.

(21) Appl. No.: 13/140,973

(22) PCT Filed: Dec. 19, 2008

(86) PCT No.: PCT/SE2008/051544
§ 371 (c)(1),
(2), (4) Date: Jan. 12, 2012

(87) PCT Pub. No.: WO2010/071531
PCT Pub. Date: Jun. 24, 2010

(65) Prior Publication Data
US 2012/0115598 A1    May 10, 2012

(51) Int. Cl.
*H04N 5/265* (2006.01)
*G06T 19/00* (2011.01)
(Continued)

(52) U.S. Cl.
CPC ........... *H04N 5/265* (2013.01); *G06T 19/006* (2013.01); *G09B 9/003* (2013.01); *H04N 5/2224* (2013.01);
(Continued)

(58) Field of Classification Search
CPC .. A63F 13/00; A63F 2001/00; A63F 2300/80; A63F 13/12; A63F 13/20;
(Continued)

(56) References Cited

U.S. PATENT DOCUMENTS 6,084,979 A * 7/2000 Kanade et al. ............... 382/154
6,445,815 B1 * 9/2002 Sato .............................. 382/154
(Continued)

FOREIGN PATENT DOCUMENTS

EP    0955606 A2 * 11/1999    ........... G06T 7/0042
EP    0955606 A2    11/1999
(Continued)

OTHER PUBLICATIONS

PCT/ISA/210—International Search Report—dated Aug. 24, 2009.
(Continued)

*Primary Examiner* — Tramar Harper
*Assistant Examiner* — Jeffrey Wong
(74) *Attorney, Agent, or Firm* — Venable LLP; Jeffri A. Kaminski

(57) ABSTRACT

A system and method for mixing a scene with a virtual scenario. An image capturing unit is arranged to capture at least one image so as to cover the scene from a first viewpoint. An image representation generation unit is arranged to generate at least one image representation based on the captured image. A game engine unit is arranged to generate a virtual scenario. An image processing unit is arranged to adapt the at least one image representation based on the generated virtual scenario so as to provide a virtual video sequence.

15 Claims, 3 Drawing Sheets

(51) Int. Cl.
  *G09B 9/00* (2006.01)
  *H04N 5/222* (2006.01)
  *H04N 5/232* (2006.01)
  *H04N 13/275* (2018.01)
  *H04N 13/183* (2018.01)
  *H04N 13/239* (2018.01)

(52) U.S. Cl.
  CPC ......... *H04N 5/232* (2013.01); *H04N 5/23229* (2013.01); *H04N 5/23238* (2013.01); *H04N 13/183* (2018.05); *H04N 13/239* (2018.05); *H04N 13/275* (2018.05); *A63F 2300/1093* (2013.01); *A63F 2300/6676* (2013.01); *A63F 2300/69* (2013.01)

(58) Field of Classification Search
  CPC ...... A63F 13/21; A63F 13/213; A63F 13/216; A63F 13/217; A63F 13/40; A63F 13/42; A63F 13/45; A63F 13/50; A63F 2300/00; A63F 2300/10; A63F 2300/1062; A63F 2300/1087; A63F 2300/205; A63F 2300/303; A63F 2300/305; A63F 2300/66
  USPC .................. 463/31–34, 37; 348/E15.001, 348/E13.01–E13.05, 578, 580
  See application file for complete search history.

(56) References Cited

U.S. PATENT DOCUMENTS

| | | | | |
|---|---|---|---|---|
| 7,084,887 | B1* | 8/2006 | Sato et al. | 345/633 |
| 7,085,409 | B2* | 8/2006 | Sawhney et al. | 382/154 |
| 7,289,130 | B1* | 10/2007 | Satoh et al. | 345/629 |
| 8,368,753 | B2* | 2/2013 | Zalewski | H04N 7/18 345/419 |
| 2002/0061131 | A1* | 5/2002 | Sawhney et al. | 382/154 |
| 2004/0105573 | A1* | 6/2004 | Neumann | G06T 17/00 382/103 |
| 2006/0066612 | A1* | 3/2006 | Yang et al. | 345/419 |
| 2006/0223635 | A1* | 10/2006 | Rosenberg | 463/37 |
| 2008/0198129 | A1* | 8/2008 | Cheng et al. | 345/156 |
| 2008/0204361 | A1* | 8/2008 | Scales et al. | 345/8 |
| 2009/0189974 | A1* | 7/2009 | Deering | 348/46 |
| 2009/0324059 | A1* | 12/2009 | Boughorbel | 382/154 |
| 2011/0148858 | A1* | 6/2011 | Ni et al. | 345/419 |
| 2011/0157229 | A1* | 6/2011 | Ni et al. | 345/646 |

FOREIGN PATENT DOCUMENTS

| | | |
|---|---|---|
| EP | 1313329 | 5/2003 |
| JP | 11331874 A | 11/1999 |
| WO | WO-0245001 A1 | 6/2002 |
| WO | WO-2007/111570 A2 | 10/2007 |
| WO | WO-2007/111570 A3 | 10/2007 |

OTHER PUBLICATIONS

PCT/IPEA/409—International Preliminary Report on Patentability—dated April 26, 2011.
W. Piekarski et al; Modifications and Hardware for Outdoor Augmented Reality Gaming; 4th Australian Linux Conference; Jan. 2003.
N. Managnenat-Thalmann et al; Virtual Worlds and Augmented Reality in Cultural Heritage Application.
S. Guven et al.; "Interaction Techniques for Exploring Historic Sites through Situated Media", Virtual Reality, IEEE, pp. 25-29, Mar. 2006.
Supplementary European Search Report—dated May 7, 2011—(Issued in Application No. 08878994.6).

* cited by examiner

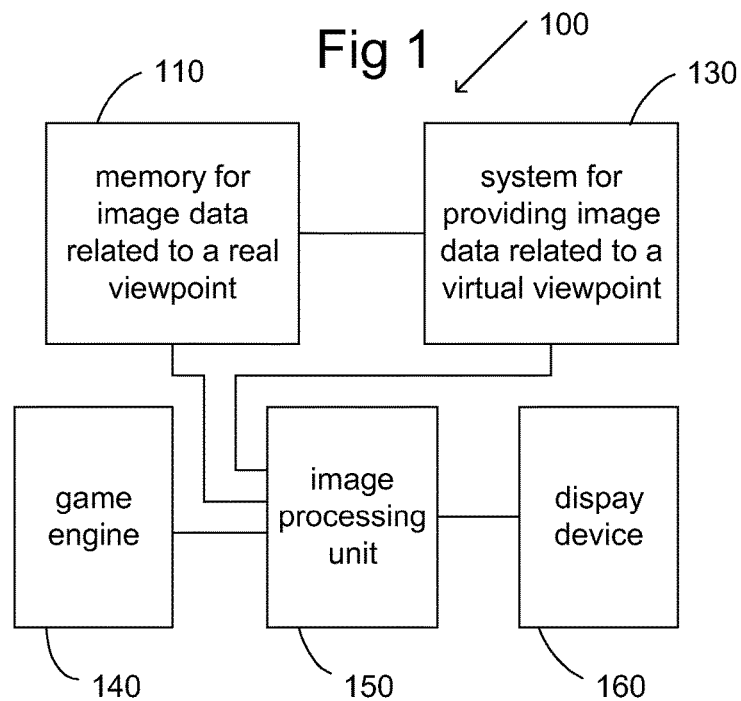
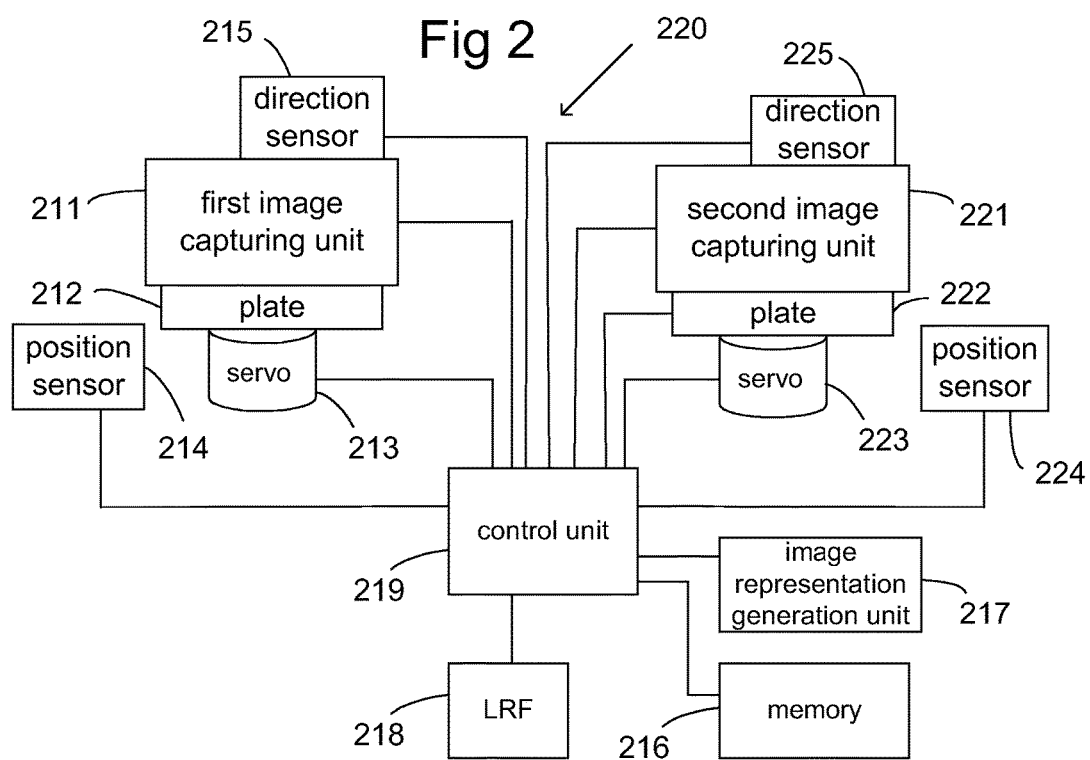

SYSTEM AND METHOD FOR MIXING A SCENE WITH A VIRTUAL SCENARIO

CROSS-REFERENCE TO RELATED APPLICATIONS

This application is the national phase under 35 U.S.C. § 371 of PCT/SE2008/051544 filed 19 Dec. 2008.

TECHNICAL FIELD

The present invention relates to a system and method for mixing a real world scene with a virtual scenario in general. Specifically, it relates to perform the mixing based on image representation generation.

BACKGROUND ART

For example, in a mixed reality presentation system, wherein a real world and virtual world are merged in a three-dimensionally matched form, the depth (front and behind) ordering of real objects and virtual objects must be correctly recognized to render the virtual objects in a form that does not conflict with that depth ordering. For this purpose, depth information (three-dimensional information) of the real world must be acquired.

EP 0 955 606 describes a depth image measurement apparatus for acquiring depth information of a scene. The depth image measurement apparatus comprises means for inputting an image of a scene at a first viewpoint and depth image generation means for generating a first depth image from the scene image inputted at the first viewpoint by said image input means. The apparatus further comprises position/posture estimation means for estimating a position and posture information at a second viewpoint viewed from a position and posture of the first viewpoint. The apparatus further comprises warping means for warping the first depth image generated by said depth image generation means to a second depth image at the second viewpoint estimated by said position/posture estimation means.

SUMMARY OF THE INVENTION

One object of the invention is to further develop the technique known in the art.

This has in one example been achieved by means of a system for mixing a scene with a virtual scenario. The system comprises image capturing means arranged to capture at least one image so as to cover the scene from a first viewpoint, and an image representation generation unit arranged to generate at least one image representation based on said captured image. The system further comprises a game engine unit arranged to generate a virtual scenario, an image processing unit arranged to adapt the at least one image representation based on said generated virtual scenario so as to provide a virtual video sequence comprising the virtual scenario mixed with the representation of the scene, and a display unit arranged to display the virtual video sequence.

The system can be used for example in military training so as to produce virtual video sequences related to a real environment or virtually created environment. The produced virtual video sequences can be displayed at a display unit located at the virtual viewing point or at a remote location. As the system comprises a game engine arranged to generate virtual scenarios, and the virtual scenarios are mixed with the background in a realistic manner, goal-oriented training can be provided for soldiers and others.

In one example, the system comprises a warping unit for warping each image representation generated by said image representation generation unit to a representation related to a second viewpoint so as to form a representation of the scene viewed from the second viewpoint. The image processing unit is then arranged to adapt the warped image representation based on said generated virtual scenario so as to provide a virtual video sequence comprising the virtual scenario mixed with the warped representation of the scene viewed from the second viewpoint. This provides flexibility, as a virtual viewing point can be chosen arbitrary within an area around a real viewing point where the real images of the environment or background were taken.

The present invention also relates to a method for mixing a scene with a virtual scenario, comprising the steps of
   providing a representation of said scene related to a first viewpoint, said representation comprising depth map data and texture data,
   generating a virtual scenario by means of a game engine unit,
   adapting the depth map data based on said generated virtual scenario, and
   forming a virtual video sequence based on said adapted depth map data and based on said texture data.

BRIEF DESCRIPTION OF THE DRAWINGS

FIG. 1 is a block scheme of a system for providing a virtual video sequence with mixed in virtual objects FIG. 2 is a block scheme of a system for providing image data related to a first viewpoint in the system of FIG. 1.

DETAILED DESCRIPTION

Figure 3:
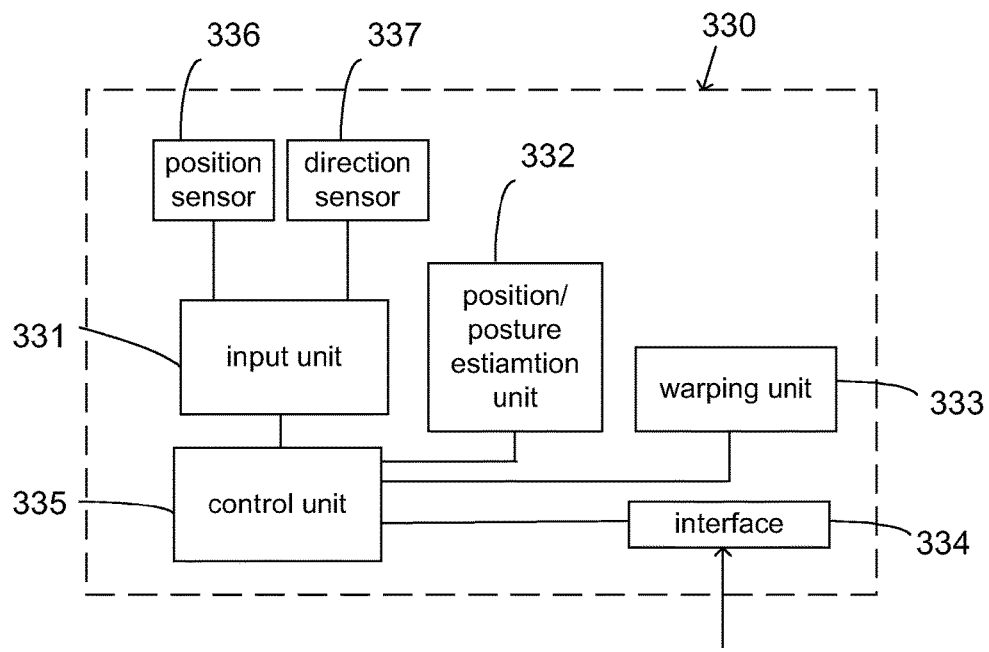
FIG. 3 is a block scheme of a system for providing image data related to a second viewpoint in the system in FIG. 1.

In FIG. 1, a system 100 for mixing a real world scene with a virtual scenario comprises a memory 110 for 3D image data related to a real viewpoint, a system 130 for providing image data related to a virtual viewpoint, a game engine 140, an image processing unit 150 for mixing in virtual objects, and a display device 160 for displaying the provided virtual video sequence with the mixed in virtual objects. The memory 110 for 3D image data related to a real viewpoint is arranged to store a representation of a scene visible from the real viewpoint. The representation comprises for example depth map data and texture data. The system 130 for providing image data related to a virtual viewpoint is arranged to warp the image data from the real viewpoint so as to form a virtual scene as viewed from the virtual viewpoint. The virtual scene is in one example formed as a representation comprising for example depth map data and texture data. A pre-assumption is that the virtual viewpoint is located in a known relation to the real viewpoint. The game engine 140 is arranged to produce data related to virtual objects to be mixed with the depth map data related to the real or virtual viewpoint. The virtual objects generated by the game engine are in one example moving objects. In an alternative example, the generated virtual objects are stationary pop-up objects. The image processing unit 150 is arranged to mix the image data from the real or virtual viewpoint with the virtual objects generated by the game engine 140. The mixed data is then fed to the display device 150. The display device is in one example associated to the sights of a weapon. Alternatively, the display device is formed as a computer screen. Alternatively, the display device is a projector arranged to display a wide screen image.

In one example, the image processing unit 150 is arranged to cut the provided data so as to relate to a predetermined or adjustable field of view. In one example, the field of view is arranged to coincide with the field of view of a given type of sight. In one example, the field of view presented by the display device is 10°. In an alternative example, the field of view is 5°.

Accordingly, the system 100 can be used for training purpose for example for training searching through a terrain with a sight having a proportionately narrow field of view. In one example, movements of the sight can be performed by marking in the image. In the example, wherein the display unit is a computer screen, the marking can be performed by means of a mouse or key board inputs or touch screen inputs.

In FIG. 2, a system 220 for providing 3D image data related to a real viewpoint is shown. The system 220 is for use in the system 100 of FIG. 1 for mixing a real world scene with a virtual scenario. The system 220 for providing 3D image data related to a real viewpoint comprises a first image capturing unit 211 positioned at said real viewpoint. The first image capturing unit 211 is in one example arranged to capture an image of a scene in front of the first image capturing unit 211. In one example, wherein the scene is wide-angle, such as covering an angle over 90°, over 180° or even 360° around, the first image capturing unit 211 is arranged to scan the scene so as to capture a plurality of images, each covering a sub-part of the entire scene. In accordance with this example, the first image capturing unit 211 is mounted on a rotatable plate 212. A control unit 219 is arranged to control a servo 213 associated to the plate 212 so as to control the rotatable plate 212 to turn to a plurality of angles of rotation. In one example, the angles of rotation are pre-defined. The control unit 219 is further arranged to control the first image capturing unit 211 to capture one image at each of said plurality of angles of rotation. The control unit 219 is further arranged to associate each image to location data related to the location of the first image capturing unit 211 at the real viewpoint. In one example, the location data comprises position and/or posture information. In one example, the position information comprises for example a coordinate for the real viewpoint given in a chosen coordinate system. In the illustrated example, a position sensor 214 is arranged in association with the real viewpoint so as to provide the coordinate for the real viewpoint. In one example, the position sensor 214 is a GPS receiver arranged to provide the coordinate for the viewpoint in a global geographical coordinate system. The posture information comprises in one example the above described angle of rotation. The control unit 219 is arranged to store each captured image along with position and/or posture information in a memory 216. This or these images forming the scene are also referred to as background image(s). In the illustrated example, a direction sensor 215 such as a compass is arranged in association with the first image capturing unit 211 arranged to provide the compass bearing or the like of the direction of the first image capturing unit 211.

The system 220 for providing 3D image data related to the real viewpoint comprises further a second image capturing unit 221. The second image capturing unit 221 is also positioned at the real viewpoint, but a known distance apart from the first image capturing unit 211. The distance is for example 2 meters or 1 meter. Accordingly, the coordinate of the second image capturing unit 221 is known. In one example, the first image capturing unit 211 and the second image capturing unit 221 are spaced apart only in a vertical direction. In one example, the second image capturing unit 221 is controlled by the control unit 219 so as to operate in synchronism with the first image capturing unit 211. In an alternative example, the second image capturing unit 221 is not arranged to operate in synchronism with the first image capturing unit 211

The images captured by the second image capturing unit 221 are stored in the memory 216. In one example, wherein it can be assumed that the second image capturing unit 221 is rotating in synchronism with the first image capturing unit 211, each second image is stored in the memory 216 together with the associated first image captured by the first image capturing unit 211.

In an alternative example (as illustrated in FIG. 2), the images from the second image capturing unit 221 are stored along with associated position information and/or posture information in the memory 216. Accordingly, the control unit 219 is as described above arranged to associate each image to location data related to the location of the second image capturing unit 221 at the real viewpoint.

In an alternative example, for example wherein the images are not associated to location data, image pairs are found using conventional image processing techniques for example based on recognition of objects in the images.

In the illustrated example, a position sensor 224 such as a GPS receiver is arranged in association with the real viewpoint so as to provide a coordinate for the second image capturing unit 221 at the real viewpoint. In the illustrated example, a directional sensor 225 such as a compass is arranged in association with the second image capturing unit 221. The direction sensor 225 is arranged to provide the compass bearing or the like, so as to relate to a global coordinate system.

In an alternative example, the system comprises one single image capturing unit, which is capturing the image(s) of the scene first from the first location and then from the second location. In one example, the first and second image capturing units are cameras such as a digital still camera or a video camera. In one example, the first and second image capturing units are comprised in a stereo camera. In order to provide a wide-angle scene, the stereo camera can be mounted on the plate 212 or 222.

As was described above, the first and second image capturing units 211, 221 are in one example arranged spaced apart in a z-direction, i.e. in a height direction. In order to improve the accuracy in the subsequent image processing, at least a third image capturing unit may be mounted in known relation to the first and second image capturing units. The third image capturing unit is arranged to capture images in the same manner as the first and second image capturing units. In accordance with this example, the at least first, second and third image capturing units are arranged in a horizontal plane. Alternatively, the at least first, second and third image capturing units are spaced apart both horizontally and vertically. In a third example, the at least first, second and third image capturing units are vertically spaced apart. Apparently, one image capturing unit can be used and moved between the different locations instead of using a plurality of image capturing units.

When more than two image capturing units are provided, an image set (instead of an image pair) is formed for each direction in the scene. Even though image sets comprising more than two images can be used, the following description relates to an example with two images in each image set (or pair).

When a pair of first and second images has been captured, each image pair is processed in an image representation generation unit 217. The image representation generation unit 217 is arranged to calculate a depth map for each image pair. The calculations performed by the processing unit so as to provide the depth map will not be described in detail herein. However, generally, since two images of the same scene captured at a known distance from each other are provided, the distance to different objects in the images can be determined by means of image processing. Objects which are very far away are located in the same position in the two images while objects which are very near the image capturing unit(s) are not located in the same position in the two images. Accordingly, the displacement of the location of an object in the two images determines the distance to the object from the image capturing device(s). Thus, the image representation generation unit 217 is arranged to provide a depth map for each first and/or second image based on the displacement of the location of objects in the two images so as to provide information about the distance to the objects in said images. In one example, one depth value is associated to each point (or pixel) in the images. In an alternative example, a subset of the points (pixels) distributed over the images are associated to a depth value. In an extended example (as illustrated herein), the image representation generation unit 217 is arranged to improve the data of the depth map by using information about known distances to one or a plurality of objects identifiable in the images. In one example, the distance to the identified object(s) in the images is known based on locally stored or received information about the locations of identifiable objects and based on knowledge about the location of the real viewpoint. In the illustrated example, a laser range finder 218 is arranged at the real viewpoint. The laser range finder 218 is arranged to measure the distance to an object at which it is pointed. The image representation generation unit 217 is then arranged to correlate the distance information with the data of the depth map. The control unit 219 is arranged to feed image data representing the first and/or second images building up the scene along with associated depth map(s) to the memory 110 for image data related to the real viewpoint (as shown in FIG. 1). As is understood from the above, the image data and/or depth maps are in one example each associated to a position and/or posture. The image data representing the first and/or second images building up the scene comprises for example texture data.

In FIG. 3, a system 330 for providing image data related to a virtual viewpoint comprises an input unit 331 for inputting location information related to the virtual viewpoint, an interface 334 arranged to receive the data from the memory 110 for image data related to the real view point, a position/posture estimation unit 332 for estimating position and/or posture information related to said virtual viewpoint in relation to said real viewpoint, and a warping unit 333 arranged to adapt the above described depth maps so as to form a virtual scene viewed from the virtual viewpoint. The data from the memory 110, received over the interface 334 comprises, as described above, the image data representing the first and/or second images building up the scene at the real viewpoint along with associated depth map(s) and possibly also position and/or posture information related to the images building up the scene.

The input unit 331 is in the illustrated example connected to a position sensor 336 such as a GPS-receiver arranged to receive position information for the virtual viewpoint. Alternatively, position data is inputted manually by means of the input unit 331. For example, the input unit is a computer mouse or joystick arranged to mark a position in a scene displayed by the display device 150. In the illustrated example, the input unit 331 is further connected to a direction sensor 337, such as a compass, arranged to provide a compass bearing or the like so as to provide an indication of the field of view from the virtual viewpoint. The position/posture estimation unit 332 is arranged to determine a relation between the position at the virtual and the real viewpoints. In accordance therewith, the position/posture estimation unit 332 is arranged to fetch position data related to the real viewpoint from the memory 110 and to receive over the interface 334 the position data from the input unit 331 related to the position of the virtual viewpoint. The position data related to the real and virtual viewpoints is in one example given in x, y and z coordinates. The position/posture estimation unit 332 is then arranged to determine the relative distance between the real and virtual viewpoints based on the position data related to the real and virtual viewpoints. The position/posture estimation unit 332 is arranged to receive the posture information from the input unit 331 and to determine a field of view from the virtual viewpoint based on said posture information and based on the position of the virtual viewpoint. Based on the determined field of view, the position/posture estimation unit 332 is arranged to elect one or a plurality of images from the memory 110 with associated depth maps corresponding to the determined field of view.

The warping unit 333 is arranged to process the depth maps of the images elected by the position/posture estimation unit 332. The processing involves adapting the distances to different objects of the depth map(s) related to the real viewpoint to the distances to said objects seen from the virtual viewpoint. The warping unit 333 is arranged to form a depth map related to the virtual viewpoint, wherein the adapted distances are given.

In one example, the location of the virtual viewpoint is continuously moving. In accordance with this example, position/posture estimation unit is arranged to elect new images/depth maps from the memory 110 based on the information from the input unit 331 related to updated positions and/or postures. The warping unit 333 is then arranged to adapt the depth map for the moving virtual viewpoint based on the updated elections. Accordingly, the depth map for the virtual viewpoint can be frequently updated so as to follow the movements of the virtual viewpoint. In one example, the updating is performed in real time. The virtual viewpoint is for example associated to a person, such as a soldier or a vehicle, such as a tank.

Figure 4:
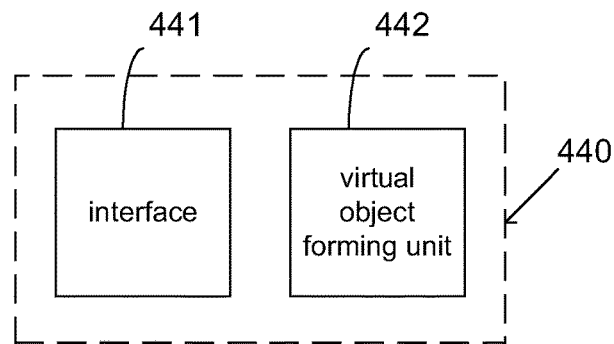
FIG. 4 is a block scheme of a game engine in the system in FIG. 1.

In FIG. 4, a game engine 440 is arranged to generate a scenario by means of virtual objects. The scenario can be automatically generated or generated in interaction with an operator. In detail, the game engine is arranged to form virtual objects to be superimposed on images provided by either the system 220 arranged to provide image data related to the real viewpoint or the system 130 arranged to provide image data related to the virtual viewpoint. In one example, the virtual objects are formed in real time. In one example, the game engine 440 is arranged to form virtual objects in the form of virtual targets in a training mode of operation of the game engine. The game engine 440 is in one example arranged to operate in an additional or alternative mode of operation, such as a combat mode of operation wherein the virtual objects comprises virtual combating forces.

The game engine 440 comprises in FIG. 4 an operator interface 441. The operator interface 441 comprises in one example input means for choosing mode of operation of the game engine 440. The operator interface 441 comprises in one example means for choosing for example types of virtual objects, distances to the chosen virtual objects, and orientation of the chosen virtual objects. In one example, the virtual objects are stationary. In an alternative example, the virtual objects are arranged to be moving. In accordance therewith, the interface comprises in one example means for electing a movement pattern or for freely choosing the movements for example by indication on a map. The map is for example formed on a touch screen on the operator interface. The information about the virtual object(s) inputted by means of the interface is fed to a virtual object forming unit 442. The interface is in one example also arranged to receive coordinate data. This data can be used for transferring images provided by the game engine to a coordinate system used by systems for providing image data related to the real and virtual viewpoints.

The virtual object forming unit 442 is arranged to form representations of the virtual objects in the form of coordinate data. In the example, wherein the virtual objects are moving, the virtual object forming unit can be arranged to provide said coordinate data in real time. The coordinate data representing the virtual object or virtual objects is feed to the image processing unit 150.

Figure 5:
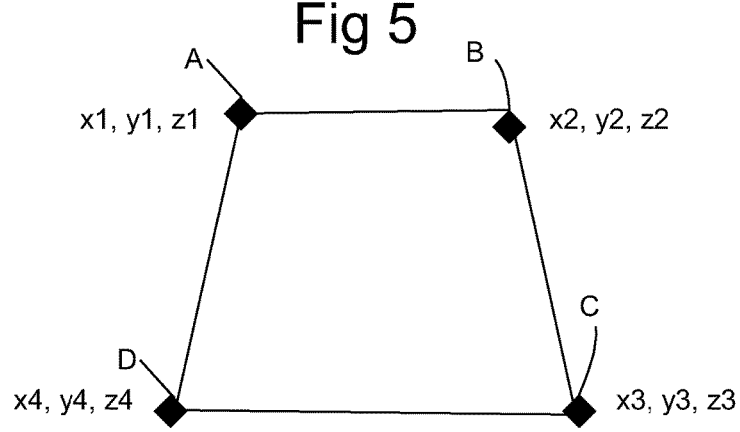
FIG. 5 is a schematic view of a virtual object.

In FIG. 5, a virtual object is built up by a number of corners A, B, C, D. Lines can be drawn between the corners A, B, C, D so as to build up a contour. Each corner of the contour is associated to a coordinate. In one example, the coordinate is given in a tree dimensional coordinate system. The coordinate system is for example a Cartesian coordinate system. The coordinate system is in one example arranged to provide latitude, longitude and height data. In an alternative example, the coordinate system is local. For example, the origin of the coordinate system can be located in the virtual viewpoint.

Figure 6:
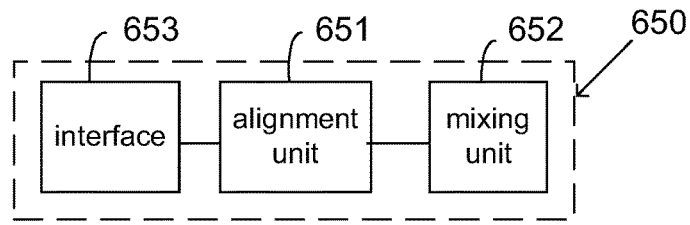
FIG. 6 is a block scheme of an image processing unit in the system in FIG. 1.

In FIG. 6, an image processing unit 650 is arranged to mix the virtual objects provided by the game engine 440 with the image representation data provided by either the real viewpoint image data system 220 or the virtual viewpoint image data system 130 so as to provide a virtual video sequence. The image processing unit 650 comprises an interface 653 for receiving the above mentioned information. In the illustrated example, the image processing unit 650 comprises an alignment unit 651 arranged to align the coordinate system used by the game engine with the coordinate system used by the real viewpoint image data system 220 and the virtual viewpoint image data system 130. The aligned coordinate data related to the virtual objects provided by the game engine 440 is then mixed in a mixing unit 652 with the image data from the real viewpoint image data system 220 or the virtual viewpoint image data system 130. The mixing unit 652 is arranged to superpose the virtual objects on the image(s) of the scene, wherein the virtual objects are not obscured by objects in the scene. Accordingly, the mixing unit is arranged to generate a video sequence, wherein the virtual objects are mixed together with the background by means of the depth map data. In the video sequence, the virtual objects can move behind real objects in the background. The video sequence provided by the mixing unit 652 is fed to the display device 160.

Figure 7:
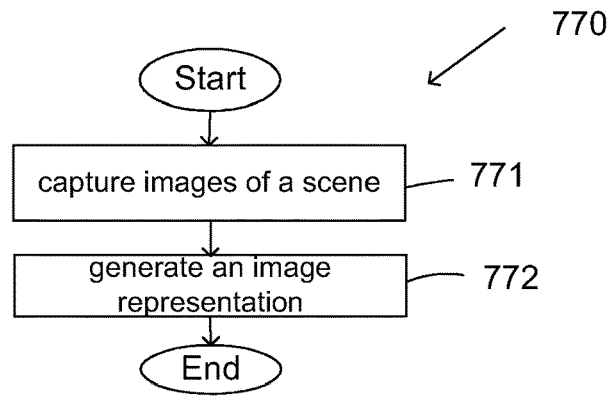
FIG. 7 is a flow chart over a method for generating a representation of a scene.

In FIG. 7, a method 770 for generating an image representation comprises a first step 771 of capturing images of a scene and a second step 772 of generating an image representation comprising depth map data and texture data or the like.

Figure 8:
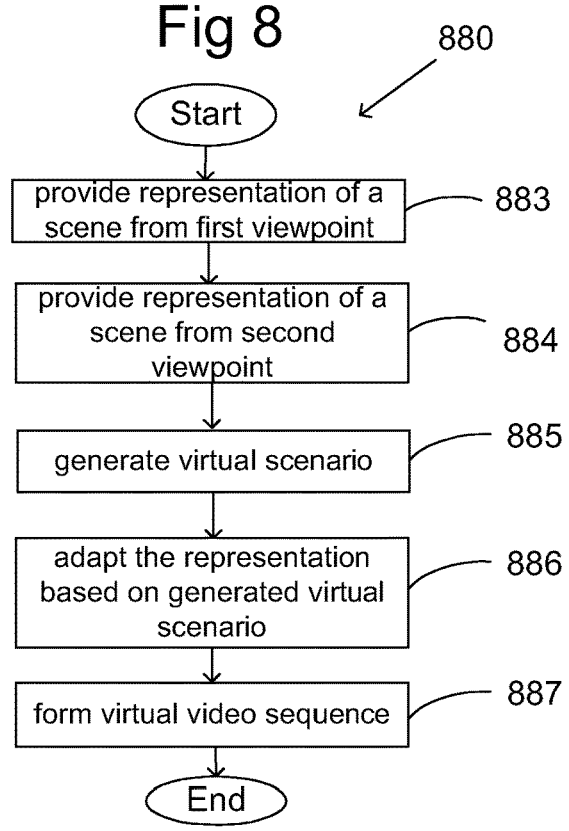
FIG. 8 is a flow chart over a method for generating a virtual video sequence representing a scene with mixed-in objects.

In FIG. 8, a method 880 for mixing a scene with a virtual scenario comprises a first step of providing 883 a representation of said scene, said representation comprising depth map data and texture data or the like. The representation of the scene is based on a real world scene. The representation directly reflects a captured image. In a second step 884, the representation is warped so as to reflect an image associated to a second, virtual viewpoint. In detail, the virtual viewpoint is placed somewhere in the undistorted image and the undistorted image is distorted in accordance with the location of the virtual viewpoint. This second step can be omitted if a representation related to the captured scene is desired.

In a third step 885, a virtual scenario is generated by means of a game engine unit. In a fourth step 886, the representation is adapted based on the generated virtual scenario. In a fifth step 887, a virtual video sequence is formed based on said adapted representation and based on said texture data.

The generation 885 of a virtual scenario comprises in one example forming depth map data and/or texture data for at least one virtual object.

The invention claimed is:

1. A system for providing a virtual video sequence, comprising:
    an image capturing unit configured to capture images so as to cover a scene viewed from a first viewpoint in a global geographical coordinate system, wherein the first viewpoint is a viewpoint of the scene from a first position in the global geographical coordinate system;
    an image representation generation unit configured to generate at least one image representation based on said captured images, said image representation comprising an image depth map comprising information about a distance to objects in said captured images provided in the global geographical coordinate system and texture data;
    a game engine unit configured to generate a virtual scenario comprising virtual objects in a coordinate system aligned with the global geographical coordinate system, wherein generating the virtual scenario comprises forming depth map data and texture data for at least one generated virtual object;
    a warping unit configured to warp the image depth map to a warped depth map related to a second viewpoint so as to form a warped representation of the scene viewed from the second viewpoint, the warped depth map comprises texture data, wherein the second viewpoint is obtained from a position of the coordinate system aligned with the global geographical coordinate system that is different than the first position of the first viewpoint;
    an image processing unit configured to mix the scene with the virtual scenario based on the warped representation of the scene viewed from the second viewpoint and on the generated scenario;
    wherein the second viewpoint is a virtual viewpoint that is a view at a distance from the image capturing unit and is arbitrarily chosen within an area around the first viewpoint, wherein the image processing unit is configured to adapt the warped depth map comprising texture data based on the formed depth map data for said generated virtual scenario so as to provide the virtual video sequence comprising the warped representation of the scene viewed from the second viewpoint mixed with the virtual scenario, and a position/posture estimation unit configured to estimate position and/or posture information at said second viewpoint in relation to said first viewpoint, wherein the position/posture estimation unit is configured to determine a field of view from the second viewpoint, wherein the position/posture estimation unit is configured to elect one or a plurality of images with associated depth maps corresponding to the determined field of view, wherein the warping unit is configured to process the depth maps of the images elected by the position/posture estimation unit, and wherein the warping unit is configured to adapt the depth map for the second viewpoint as it is moving based on updated images with the associated depth maps elected by the position/posture estimation unit.

2. The system according to claim 1, wherein the game engine unit is configured to generate a sequence of virtual objects in accordance with a tactical scenario.

3. The system according to claim 1, further comprising:
a display unit configured to display the virtual video sequence.

4. The system according to claim 3, wherein the display unit is configured to act as a sight.

5. The system according to claim 4, wherein the display unit is configured to act as a sight of a weapon.

6. The system according to claim 4, wherein the display unit is formed at a sight.

7. The system according to claim 3, wherein the display unit is a computer screen.

8. The system according to claim 1, wherein the warping unit is configured to update the depth map in real time to follow movements of the second viewpoint as it is moving based on updated images with the associated depth maps elected by the position/posture estimation unit.

9. The system according to claim 1, wherein the virtual video sequence is formed based on the texture data.

10. A method for generating a virtual scenario, the method comprising:
providing a representation of a scene related to a first viewpoint, said representation comprising an image depth map data and texture data, the image depth map comprising information about a distance to objects in images provided in a global geographical coordinate system and texture data, wherein the first viewpoint is a viewpoint of the scene from a first position in the global geographical coordinate system;
providing a representation of the scene viewed from a second viewpoint that is a virtual viewpoint that is different from the first viewpoint, wherein providing a warped image representation of the scene viewed from the second viewpoint comprises warping at least the depth map data of the representation of the scene so as to provide a warped depth map corresponding to the second viewpoint and comprising texture data;
generating the virtual scenario utilizing a game engine unit, wherein the virtual scenario comprising virtual objects is generated in a coordinate system aligned with a coordinate system of the image depth map, wherein generating the virtual scenario comprises forming depth map data and texture data for at least one generated virtual object;
mixing the scene with the virtual scenario based on the representation of the scene viewed from the second viewpoint and on the generated scenario;
choosing the second viewpoint arbitrarily within an area around the first viewpoint, wherein the second viewpoint is from a position that is different than the first position of the first viewpoint,
wherein mixing the scene with the virtual scenario comprises adapting the warped image representation based on the formed depth map data for said generated virtual scenario so as to provide a virtual video sequence comprising the warped representation of the scene viewed from the second viewpoint mixed with the virtual scenario,
estimating position and posture information at said second viewpoint in relation to said first viewpoint;
determining a field of view from the second viewpoint;
electing at least one image with associated depth maps corresponding to the determined field of view; and
processing the depth maps of the elected images so as to provide the representation of the scene viewed from the second viewpoint.

11. The method according to claim 10, wherein the generation of a virtual scenario comprises forming at least one of depth map data or texture data for at least one virtual object.

12. A virtual scenario generating device, comprising:
a memory unit configured to store images covering a scene from a first viewpoint, wherein the images each are associated to position information and posture information, wherein the position information comprises a coordinate in a global coordinate system and the posture information comprises a compass bearing, wherein the first viewpoint is a viewpoint of the scene from a first position in a global geographical coordinate system;
an image representation generation unit configured to generate at least one image representation in the global coordinate system based on the images stored in the memory unit, said image representation comprising an image depth map comprising information about a distance to objects in the images provided in the global geographical coordinate system and texture data;
a game engine unit configured to generate a virtual scenario comprising virtual objects in a coordinate system aligned with the global coordinate system, wherein generating the virtual scenario comprises forming depth map data and texture data for at least one generated virtual object;
a warping unit configured to warp the image depth map to a warped depth map related to a second viewpoint so as to form a representation of the scene viewed from the second viewpoint, wherein the second viewpoint is from a position of the coordinate system aligned with the global geographical coordinate system that is different than the first position of the first viewpoint, and the warped depth map comprising texture data;
an image processing unit configured to mix the scene with the virtual scenario based on the representation of the scene viewed from the second viewpoint and on the virtual scenario;
wherein the second viewpoint is a virtual viewpoint that is arbitrarily chosen within an area around the first viewpoint, wherein the image processing unit is configured to adapt the warped depth map based on the formed depth map data for the generated virtual scenario so as to provide a virtual video sequence comprising the warped representation of the scene viewed from the second viewpoint mixed with the virtual scenario, and a position/posture estimation unit configured to estimate position and/or posture information at said second viewpoint in relation to said first viewpoint, wherein the position/posture estimation unit is configured to determine a field of view from the second viewpoint, wherein the position/posture estimation unit is configured to elect one or a plurality of images with associated depth maps corresponding to the determined field of view and wherein the warping unit is configured to process the depth maps of the images elected by the position/posture estimation unit and wherein the warping unit is configured to adapt the depth map for the second viewpoint as it is moving based on updated images with the associated depth maps elected by the position/posture estimation unit.

13. The virtual scenario generating device of claim 12, wherein the warping unit is configured to update the depth map in real time to follow movements of the second viewpoint as it is moving based on updated images with the associated depth maps elected by the position/posture estimation unit.

14. A training system, comprising:
- a memory unit configured to store images covering a scene from a first viewpoint, wherein the images are each associated with position information and posture information, wherein the position information comprises a coordinate in a global coordinate system and the posture information comprises a compass bearing, wherein the first viewpoint is a viewpoint of the scene from a first coordinate in a global geographical coordinate system;
- an image representation generation unit configured to generate at least one image representation in the global coordinate system based on the images stored in the memory unit, said image representation comprising an image depth map comprising texture data and comprising information about a distance to objects in the images provided in the global geographical coordinate system;
- a game engine unit configured to generate a virtual scenario comprising virtual objects in a coordinate system aligned with the global coordinate system, wherein generating the virtual scenario comprises forming depth map data and texture data for at least one generated virtual object;
- a warping unit configured to warp the image depth map to a warped depth map related to a second viewpoint so as to form a warped representation of the scene viewed from the second viewpoint, wherein the second viewpoint is from a position of the coordinate system aligned with the global geographical coordinate system that is different than the first coordinate of the first viewpoint, the warped depth map comprising texture data;
- an image processing unit configured to mix the scene with the virtual scenario based on the warped representation of the scene viewed from the second viewpoint and on the virtual scenario,
wherein the second viewpoint is a virtual viewpoint that is arbitrarily chosen within an area around the first viewpoint,
wherein the image processing unit is configured to adapt the warped depth map based on the formed depth map data for the generated virtual scenario so as to provide a virtual video sequence comprising the warped representation of the scene viewed from the second viewpoint mixed with the virtual scenario,
- a weapon having a sight configured to display the virtual video sequence and a position/posture estimation unit for estimating position and/or posture information at said second viewpoint in relation to said first viewpoint,
wherein the position/posture estimation unit is configured to determine a field of view from the second viewpoint,
wherein the position/posture estimation unit is configured to elect one or a plurality of images with associated depth maps corresponding to the determined field of view and wherein the warping unit is configured to process the depth maps of the images elected by the position/posture estimation unit and wherein the warping unit is configured to adapt the depth map for the second viewpoint as it is moving based on updated images with the associated depth maps elected by the position/posture estimation unit.

15. The training system according to claim 14, wherein the warping unit is configured to update the depth map in real time to follow movements of the second viewpoint as it is moving based on updated images with the associated depth maps elected by the position/posture estimation unit.

* * * * *